US009565987B2

(12) United States Patent
Poyner et al.

(10) Patent No.: US 9,565,987 B2
(45) Date of Patent: Feb. 14, 2017

(54) SYSTEM AND ASSOCIATED METHOD FOR PREVENTING OVERFILLING IN A DISHWASHER

(71) Applicant: ELECTROLUX HOME PRODUCTS, INC., Charlotte, NC (US)

(72) Inventors: Dennis A. Poyner, Kinston, NC (US); Glen Mitchell, Goldsboro, NC (US); Jason Duckworth, Enskede (SE); John DeFilippi, Raleigh, NC (US); Virgil J. Francisco, Ayden, NC (US)

(73) Assignee: Electrolux Home Products, Inc., Charlotte, NC (US)

( * ) Notice: Subject to any disclaimer, the term of this patent is extended or adjusted under 35 U.S.C. 154(b) by 110 days.

(21) Appl. No.: 14/497,918

(22) Filed: Sep. 26, 2014

(65) Prior Publication Data
US 2015/0020887 A1 Jan. 22, 2015

Related U.S. Application Data

(62) Division of application No. 12/827,784, filed on Jun. 30, 2010, now Pat. No. 8,876,980.

(51) Int. Cl.
*B08B 7/04* (2006.01)
*A47L 15/00* (2006.01)
(Continued)

(52) U.S. Cl.
CPC ........ *A47L 15/0049* (2013.01); *A47L 15/4217* (2013.01); *A47L 15/4223* (2013.01);
(Continued)

(58) Field of Classification Search
None
See application file for complete search history.

(56) References Cited

U.S. PATENT DOCUMENTS 2,882,366 A 4/1959 Fay
3,439,687 A 4/1969 Cushing
(Continued)

FOREIGN PATENT DOCUMENTS

DE 30 21 081 A1 12/1981
DE 80 10 288 U1 8/1984
(Continued)

OTHER PUBLICATIONS

Invitation to Pay Additional Fees and, Where Applicable, Protest Fee and Annex to Form PCT/ISA/206 Communication Relating to the Results of the Partial International Search, received Mar. 12, 2012.

(Continued)

*Primary Examiner* — Eric Golightly
(74) *Attorney, Agent, or Firm* — Alston & Bird LLP

(57) ABSTRACT

A method, system, and computer-program product for preventing overfilling in a dishwasher are disclosed herein. According to one embodiment, a method for preventing overfilling in a dishwasher is provided, wherein the dishwasher includes a water valve for providing water to the dishwasher and a drain pump for removing water from the dishwasher. The method comprises detecting an overfill condition in the dishwasher with at least one detection device, wherein the overfill condition corresponds to a water level in the dishwasher that is greater than a predetermined threshold. The method further includes controlling the drain pump and the water valve in response to detecting the overfill condition in order to facilitate removal of the overfill condition.

20 Claims, 13 Drawing Sheets

(51) Int. Cl.
*A47L 15/42* (2006.01)
*D06F 39/08* (2006.01)
*G05B 15/02* (2006.01)

(52) U.S. Cl.
CPC ........ *A47L 15/4244* (2013.01); *D06F 39/087* (2013.01); *G05B 15/02* (2013.01); *A47L 2401/09* (2013.01); *A47L 2401/20* (2013.01); *A47L 2401/22* (2013.01); *A47L 2501/01* (2013.01); *A47L 2501/02* (2013.01); *A47L 2501/04* (2013.01); *A47L 2501/05* (2013.01); *A47L 2501/26* (2013.01); *Y10T 137/0318* (2015.04); *Y10T 137/729* (2015.04)

(56) References Cited

U.S. PATENT DOCUMENTS

| | | |
|---|---|---|
| 3,464,437 A | 9/1969 | Zane |
| 3,835,880 A | 9/1974 | Hoffman et al. |
| 3,844,299 A | 10/1974 | Athey et al. |
| 3,846,615 A | 11/1974 | Athey et al. |
| 3,986,372 A | 10/1976 | Karklys |
| 4,069,425 A | 1/1978 | Cushing |
| 4,180,095 A | 12/1979 | Woolley et al. |
| 4,241,400 A | 12/1980 | Kiefer |
| 4,245,310 A | 1/1981 | Kiefer |
| 4,271,861 A | 6/1981 | Crawford |
| 4,301,829 A | 11/1981 | Rowe |
| 4,318,084 A | 3/1982 | Scott et al. |
| 4,334,143 A | 6/1982 | Cushing |
| 4,796,473 A | 1/1989 | Custer |
| 5,018,550 A | 5/1991 | Burdorff |
| 5,309,939 A | 5/1994 | Stickel et al. |
| 5,361,439 A | 11/1994 | Malchow |
| 5,611,867 A | 3/1997 | Cooper et al. |
| 5,669,983 A | 9/1997 | Cooper et al. |
| 5,755,244 A | 5/1998 | Sargeant et al. |
| 5,762,080 A | 6/1998 | Edwards et al. |
| 5,770,058 A | 6/1998 | Jozwiak |
| 5,797,409 A | 8/1998 | Cooper et al. |
| 5,806,541 A | 9/1998 | Cooper et al. |
| 5,957,144 A | 9/1999 | Neff et al. |
| 6,007,640 A | 12/1999 | Neff et al. |
| 6,103,017 A | 8/2000 | Thies et al. |
| 6,125,870 A | 10/2000 | Furmanek |
| 6,129,110 A | 10/2000 | Kolb |
| 6,752,875 B2 | 6/2004 | Kiesler et al. |
| 6,811,617 B2 | 11/2004 | Elick et al. |
| 7,146,670 B2 | 12/2006 | McGill et al. |
| 7,232,494 B2 | 6/2007 | Rappette |
| 7,241,347 B2 | 7/2007 | Elick et al. |
| 7,472,714 B2 | 1/2009 | Elick et al. |
| 7,520,283 B2 | 4/2009 | Lee |
| 7,556,050 B2 | 7/2009 | Lee |
| 2002/0108441 A1 | 8/2002 | Liu |
| 2003/0056300 A1 | 3/2003 | Ruhl et al. |
| 2004/0255988 A1 | 12/2004 | DuHack et al. |
| 2005/0051201 A1 | 3/2005 | Ashton et al. |
| 2005/0236019 A1 | 10/2005 | Bang |
| 2005/0241675 A1 | 11/2005 | Jung et al. |
| 2006/0174917 A1 | 8/2006 | Hedstrom et al. |
| 2006/0237035 A1 | 10/2006 | Ferguson et al. |
| 2006/0237052 A1 | 10/2006 | Picardat et al. |
| 2007/0017551 A1 | 1/2007 | Hartogh |
| 2007/0034236 A1 | 2/2007 | Reichold |
| 2008/0078243 A1 | 4/2008 | Jeon et al. |
| 2008/0163930 A1 | 7/2008 | Ha |
| 2009/0078288 A1 | 3/2009 | Son |

FOREIGN PATENT DOCUMENTS

| | | |
|---|---|---|
| DE | 34 30 639 A1 | 3/1986 |
| DE | 35 13 640 A1 | 10/1986 |
| DE | 36 23 081 A1 | 1/1988 |
| DE | 38 39 200 A1 | 5/1990 |
| DE | 40 22 439 A1 | 1/1992 |
| DE | 42 19 146 A1 | 12/1992 |
| DE | 42 38 450 A1 | 5/1994 |
| DE | 94 06 281 U1 | 9/1995 |
| DE | 44 41 519 A1 | 5/1996 |
| DE | 103 12 744 A1 | 9/2004 |
| DE | 10 2006 013 312 B3 | 5/2007 |
| EP | 0 669 099 A2 | 8/1985 |
| EP | 0 461 722 A1 | 12/1991 |
| GB | 2 038 171 | 7/1980 |
| GB | 2 123 148 A | 1/1984 |
| GB | 2 139 084 A | 11/1984 |
| JP | 2002065566 A | 3/2002 |
| JP | 2002065567 A | 3/2002 |

OTHER PUBLICATIONS

International Search Report and Written Opinion for Application No. PCT/US2011/038986 dated Oct. 23, 2012.

SYSTEM AND ASSOCIATED METHOD FOR PREVENTING OVERFILLING IN A DISHWASHER

CROSS REFERENCES TO RELATED APPLICATION

This application is a divisional of and claims priority to U.S. application Ser. No. 12/827,784, entitled "System and Associated Method for Preventing Overfilling in a Dishwasher," filed Jun. 30, 2010, and issued as U.S. Pat. No. 8,876,980 on Nov. 4, 2014, which is herein incorporated by reference in its entirety.

FIELD OF THE INVENTION

Embodiments of the present invention relate to dishwashers and, more particularly, to a system and associated method for preventing overfilling in a dishwasher.

BACKGROUND

Dishwashers have become an integral part of everyday household use. Typical dishwashers use water pumped into a tub to clean dishes and utensils. In a typical cycle there are multiple water fills with intermediate pump outs. If a malfunction occurs that results in excessive water input or failure to pump out, flooding may occur. Many dishwashers, either with a stainless steel or a plastic tub, depend solely upon the function of a mechanical float for physically activating a float switch, in response to a flood condition within the tub. In general, the stem of the float extends downwardly from the float through a central opening in the switch support housing and outwardly of the tub in order to activate the float switch. As such, since the stem of the float must move freely through the central opening, the central opening may be configured to be open to atmosphere inside the tub. This open-to-atmosphere condition may thus create a potential path for water to leak out of the unit.

A flood condition in the dishwasher could occur due to a single component failure or a combination of component failures. For example, a sticking or otherwise defective float switch may fail to properly signify a high water level condition and thereby cause a flood condition. Often times, the float switch may be the sole provision for detecting the high water level condition. In some instances, combinations of a faulty water inlet valve, a clogged drain filter and/or drain hose, and/or a faulty float switch can also cause a flood condition.

Thus, there is a need for an effective method and system for preventing overfilling in a dishwasher, as well as a need to diagnose potential malfunctions in particular components of the dishwasher causing the overfilling.

SUMMARY OF THE INVENTION

In light of the foregoing background, embodiments of the present invention provide methods, systems, and computer-program products for preventing overfilling in a dishwasher. Embodiments of a dishwasher may advantageously detect and remove an overfill condition in a dishwasher as well as determine which components are malfunctioning when the overfill condition is not removed.

One embodiment is directed to a method for preventing overfilling in a dishwasher, wherein the dishwasher comprises a water valve for providing water to the dishwasher and a drain pump for removing water from the dishwasher. The method comprises detecting an overfill condition in the dishwasher with at least one detection device, wherein the overfill condition corresponds to a water level in the dishwasher that is greater than a predetermined threshold. The method also comprises controlling the drain pump and the water valve in response to detecting the overfill condition in order to facilitate removal of the overfill condition. The method may further comprise controlling the drain pump and the water valve either until the overfill condition is removed or for a predetermined amount of time. This controlling may comprise closing the water valve and actuating the drain pump in a first pump-out cycle until the overfill condition is removed. Additionally, the method could comprise deactuating the drain pump when the overfill condition is removed.

In another embodiment, the method further comprises executing a water valve error routine. The water valve error routine comprises detecting an overfill condition with the detection device following the first pump out cycle and determining the number of consecutive overfill conditions detected. The water valve error routine may further comprise actuating the drain pump in an ongoing pump out cycle until the overfill condition is removed in response to detecting a predetermined number of consecutive overfill conditions. Additionally, the method could further comprise determining a flow rate of the water through the water valve and an elapsed time between successive pump out cycles. Finally, the method may further comprise providing a water valve error signal in response to detecting a predetermined number of overfill conditions with the detection device.

The method, in another embodiment, may further comprise executing a drain pump/detection device error routine. The drain pump/detection device error routine comprises determining whether water is present in the dishwasher with a sensing device (e.g., a turbidity sensor) following the step for controlling the drain pump and water valve for a predetermined period of time. The drain pump/detection device error routine may further comprise providing a detection device error signal in response to sensing no water in the dishwasher. Alternatively, the drain pump/detection device error routine may further comprise providing a drain pump error signal in response to sensing the presence of water in the dishwasher.

Additionally, in another embodiment, the method may further comprise executing a clog error routine, the clog error routine comprising closing the water valve and actuating the drain pump for a predetermined period of time. The clog error routine may further comprise providing a drain filter or drain hose error in response to detecting an overfill condition following the predetermined period of time.

In another embodiment, the method may further comprise detecting an overfill condition with at least one detection device comprising a float and a float switch, wherein the float is movable in relation to the float switch such that the float switch is configured to be actuated when the float is activated by an overfill condition. For example, the float switch may be at least one magnetically actuated reed switch configured to be actuated in response to movement of a magnet associated with the float.

Another embodiment is directed to a system for preventing overfilling in a dishwasher, comprising a water valve for providing water to the dishwasher, a drain pump for removing water from the dishwasher, at least one detection device for detecting an overfill condition in the dishwasher, wherein the overfill condition corresponds to a water level in the dishwasher that is greater than a predetermined threshold, and a control device for controlling the drain pump and the water valve in response to detecting the overfill condition in order to facilitate removal of the overfill condition. The detection device may comprise a float and a float switch, wherein the float is movable in relation to the float switch such that the float switch is configured to be actuated when the float is activated by an overfill condition. Also, the float switch could comprise at least one magnetically actuated reed switch configured to be actuated in response to movement of a magnet associated with the float. Additionally, the system could further comprise a turbidity sensor for sensing the presence of water in the dishwasher and communicating with the control device.

Moreover, another embodiment is directed to a computer program product for preventing overfilling in a dishwasher, the computer program product comprising a computer-readable storage medium having computer-readable program code portions stored therein. The computer-readable program code portions comprise a first executable portion for detecting an overfill condition in the dishwasher with at least one detection device, wherein the overfill condition corresponds to a water level in the dishwasher that is greater than a predetermined threshold, and a second executable portion for controlling the drain pump and the water valve in response to detecting the overfill condition in order to facilitate removal of the overfill condition.

BRIEF DESCRIPTION OF THE DRAWINGS

Figure 1:
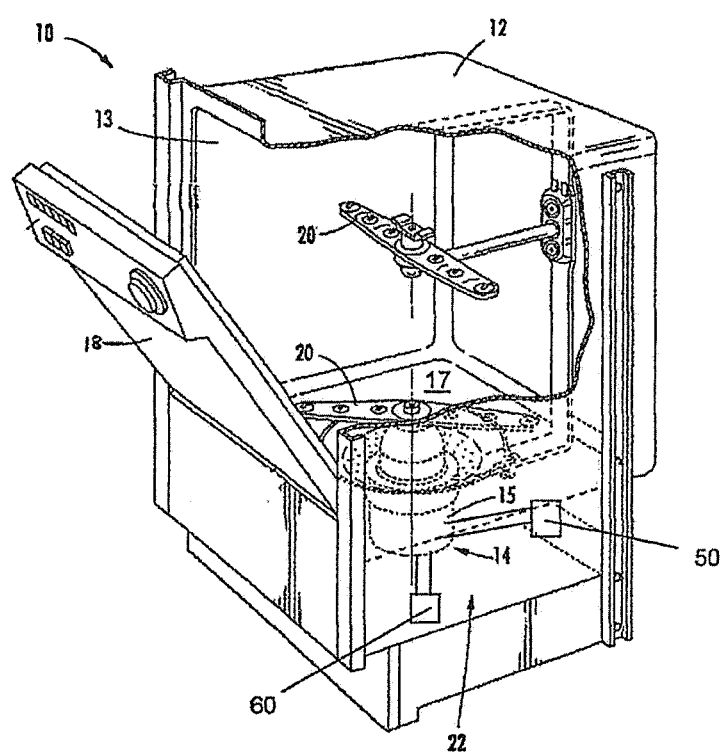
Figure 2:
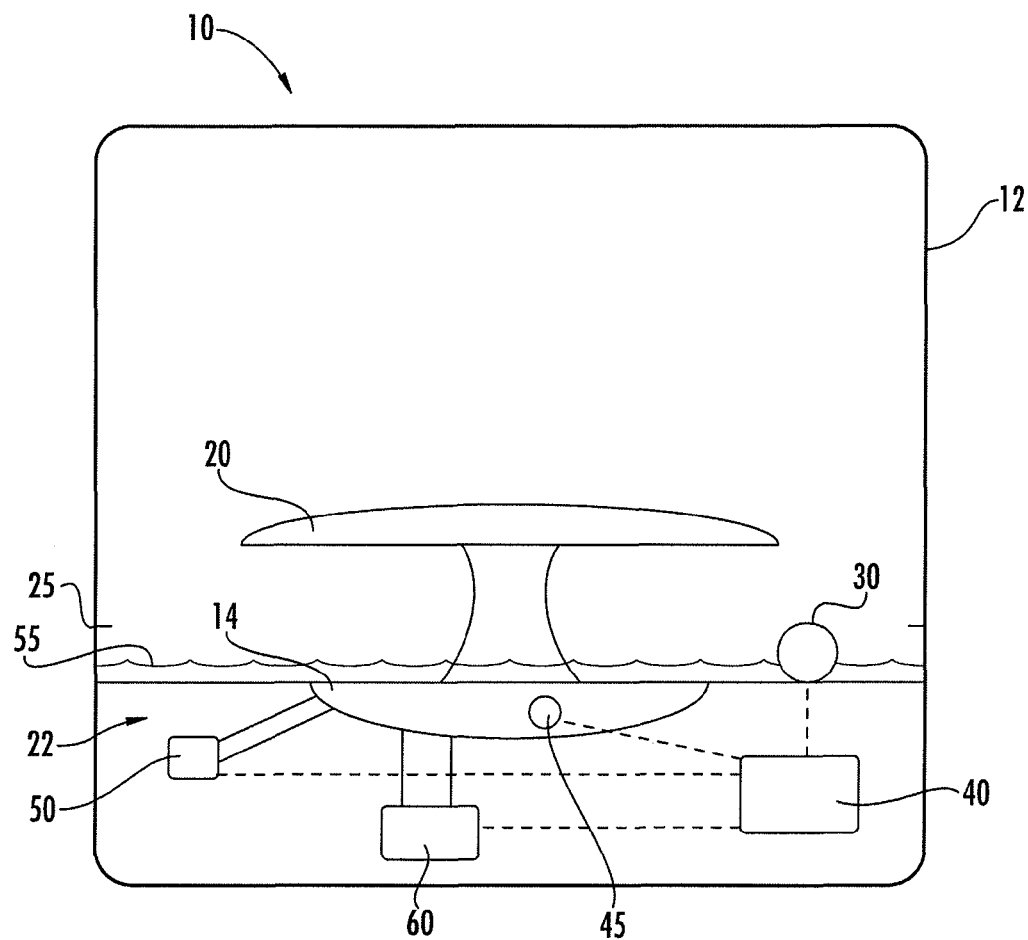
Figure 3:
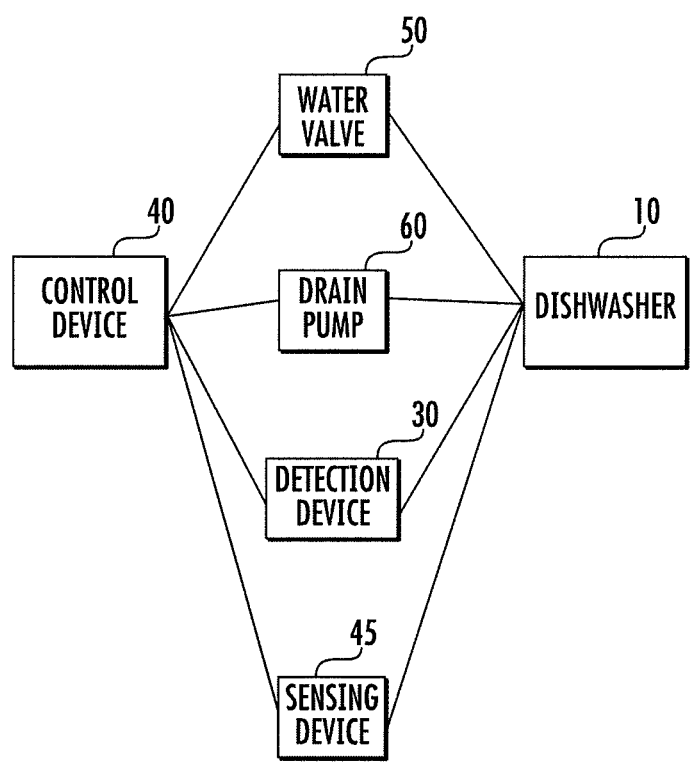
Figure 4:
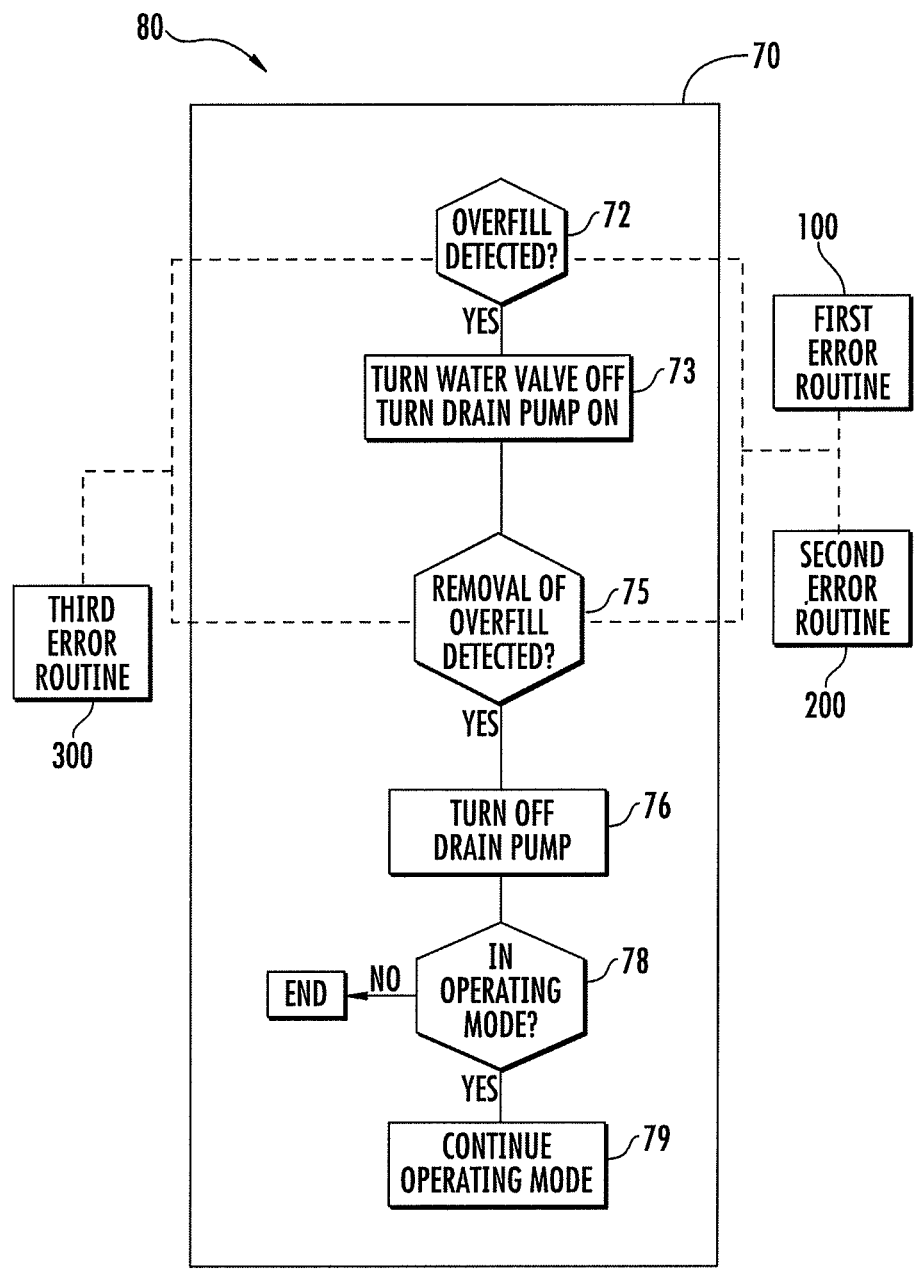
Figure 5:
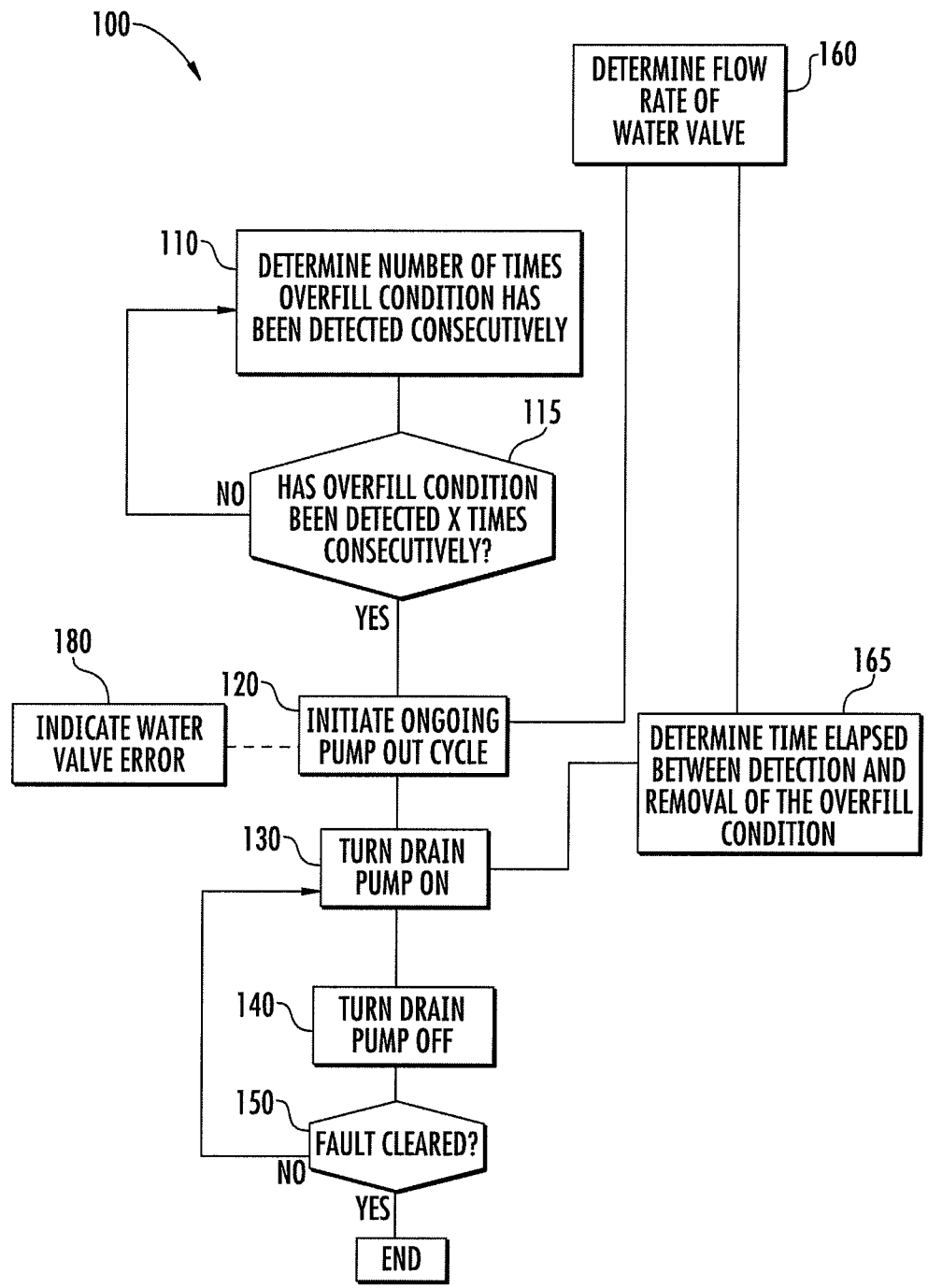
Figure 6:
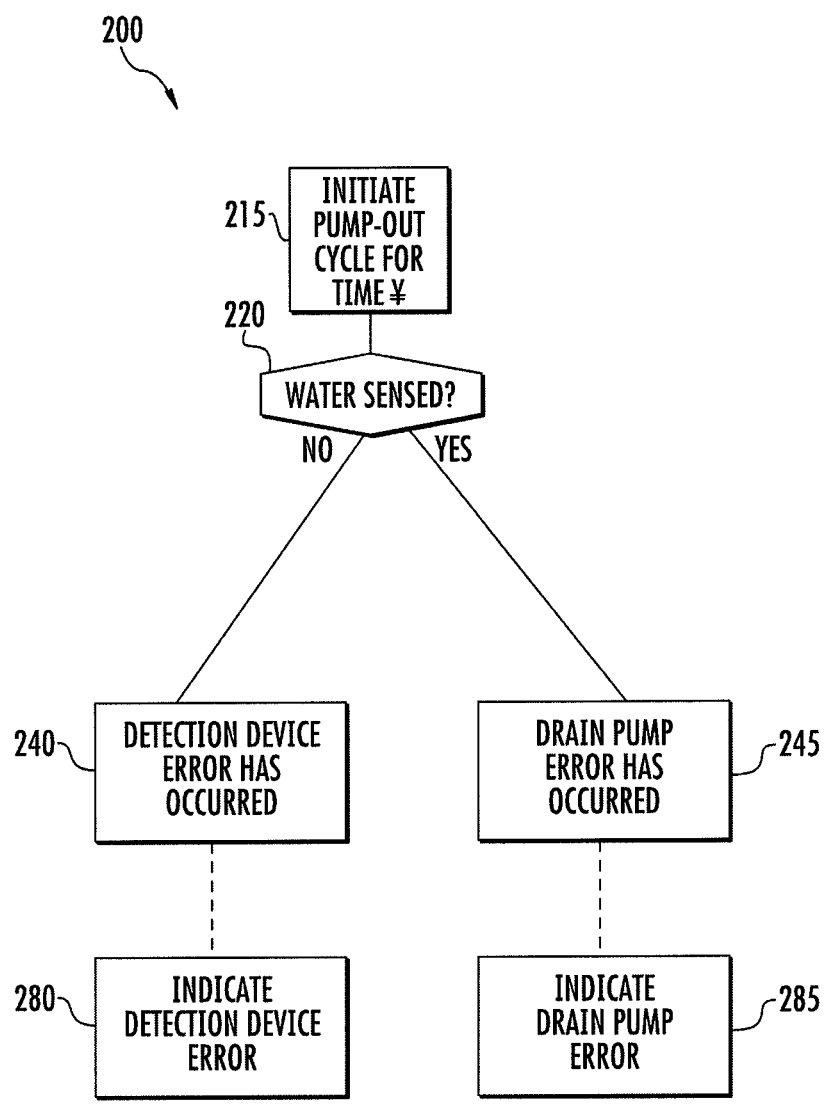
Figure 7:
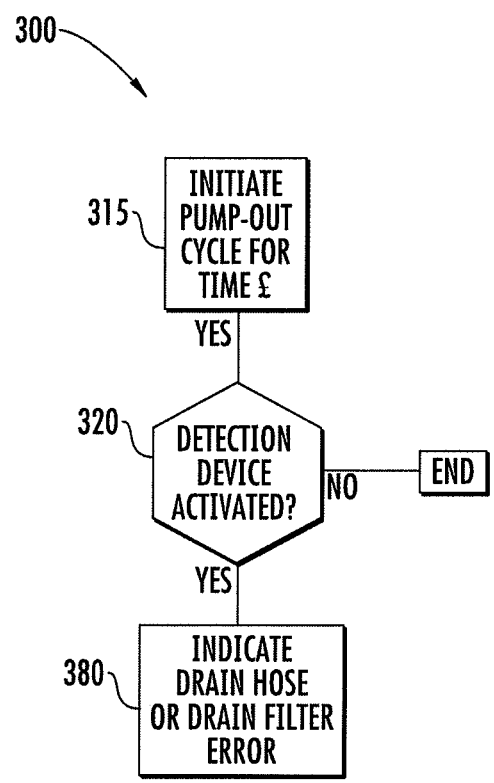
Figure 8:
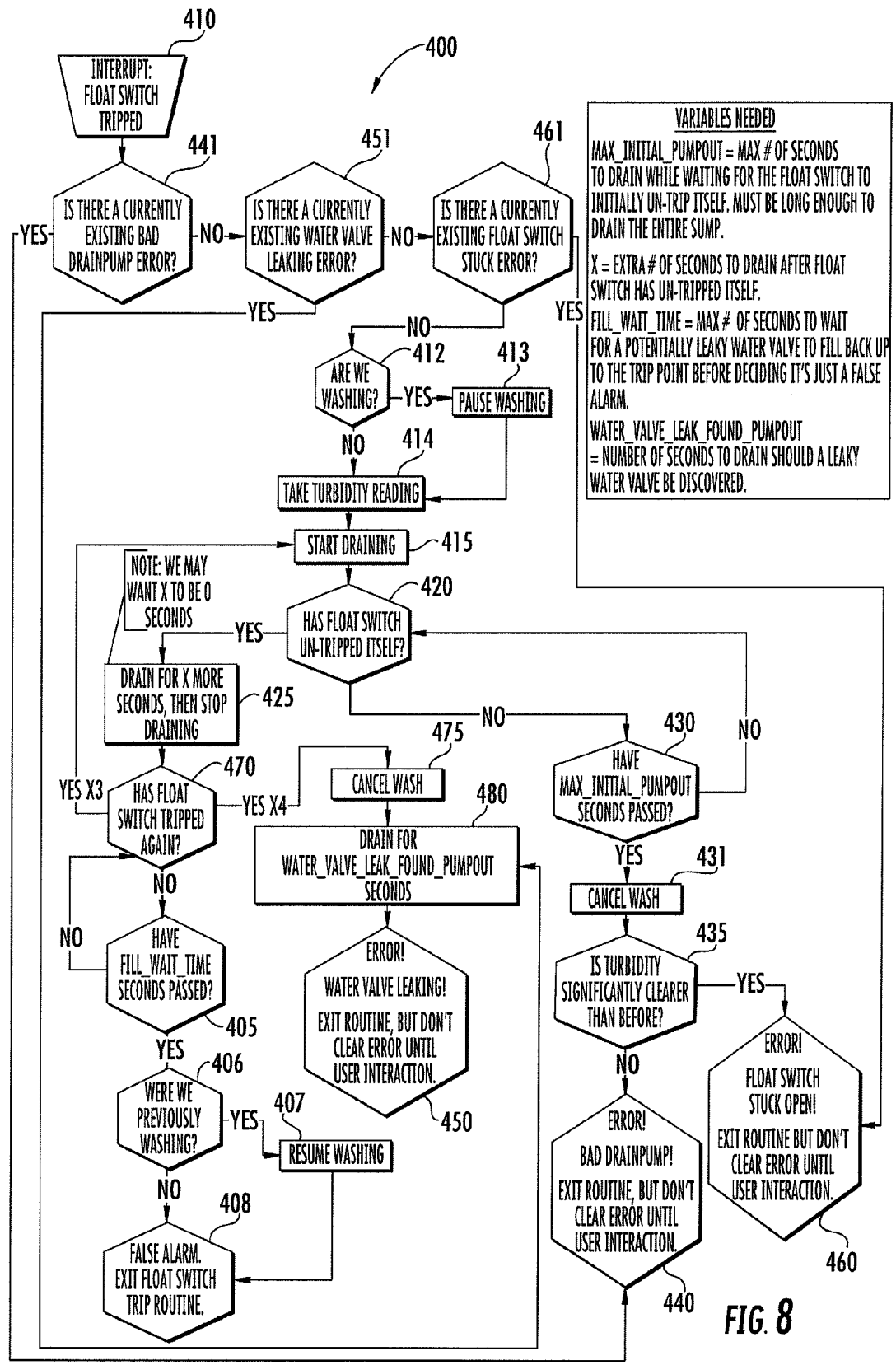
Figure 9:
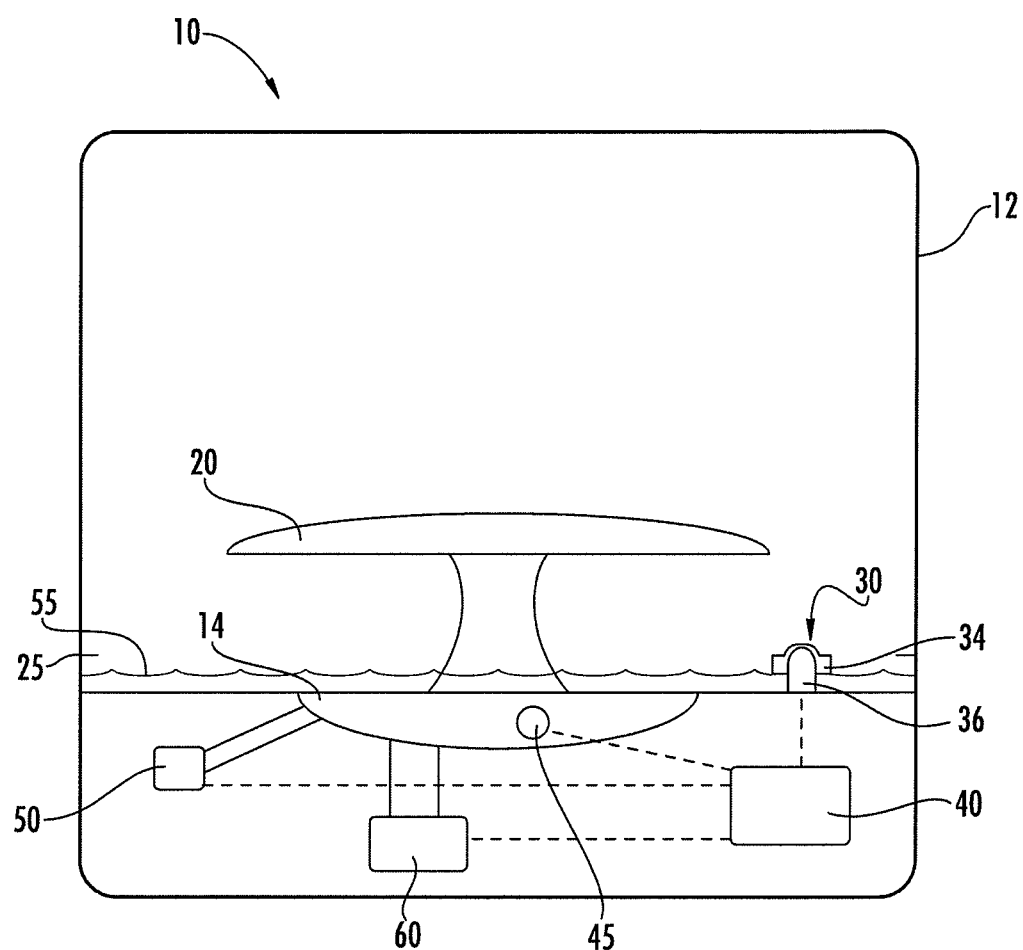
Figure 10:
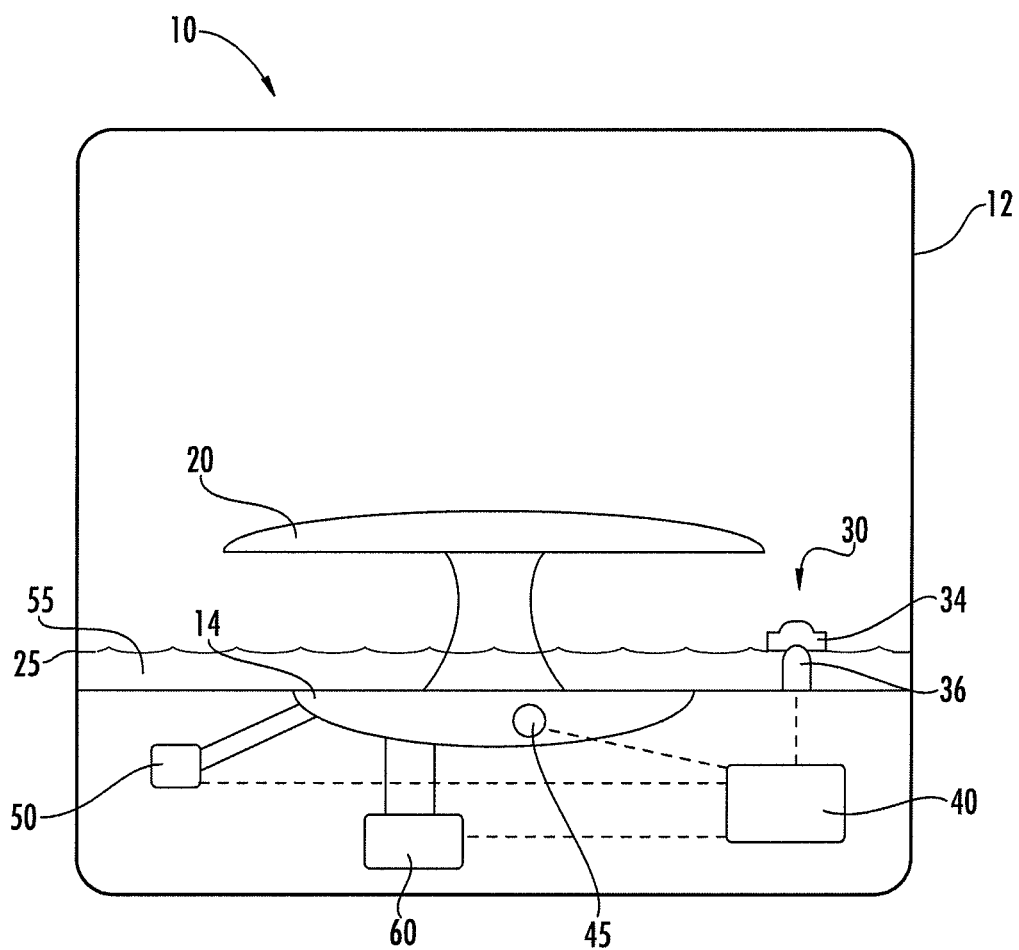
Figure 11:
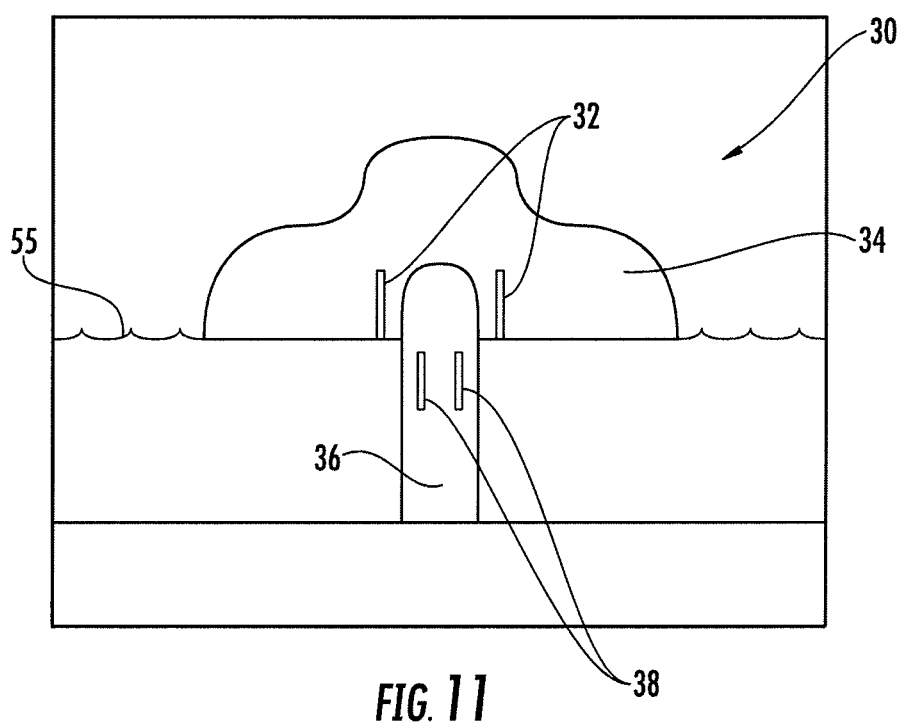
Figure 12:
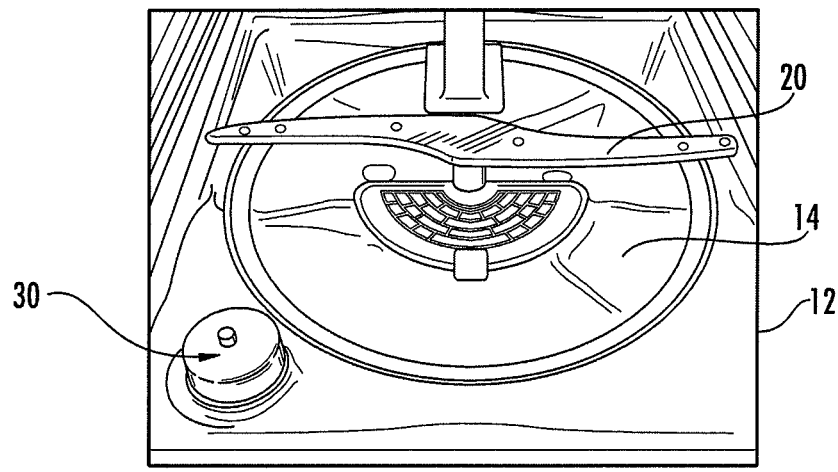
Figure 13:
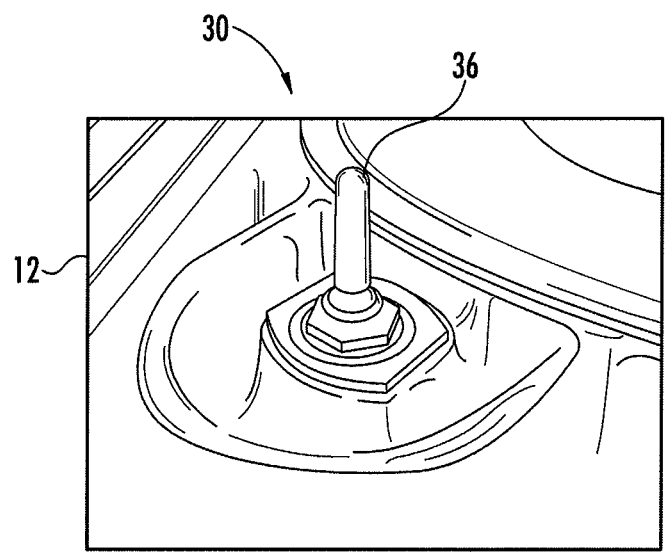
Figure 14:
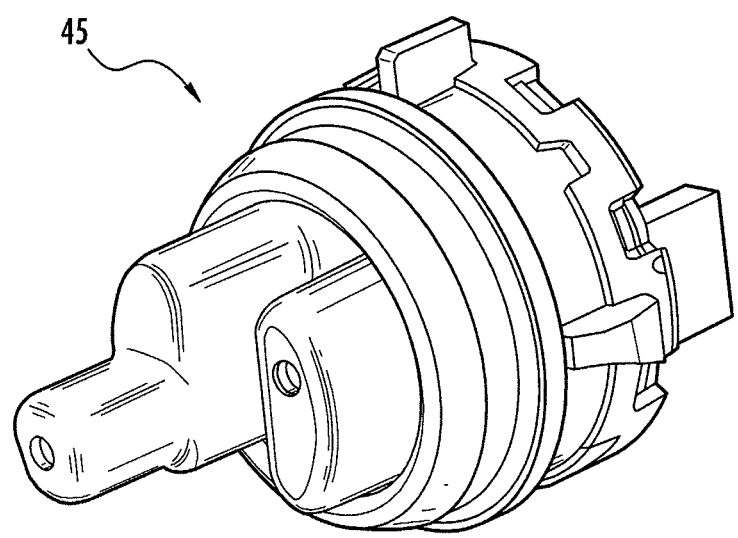

Having thus described various embodiments of the invention in general terms, reference will now be made to the accompanying drawings, which are not necessarily drawn to scale, and wherein:

FIG. 1 is a perspective view of a dishwasher, wherein the dishwasher is partially cut away, according to one embodiment of the present invention;

FIG. 2 is a sectional view of the inside of a dishwasher, according to one embodiment of the present invention;

FIG. 3 is a block diagram of a system for preventing overfilling in dishwasher, according to one embodiment of the present invention;

FIG. 4 is a flow chart of an overfill routine for preventing overfilling in a dishwasher, according to one embodiment of the present invention;

FIG. 5 is a flow chart of a water valve error routine, according to one embodiment of the present invention;

FIG. 6 is a flow chart of a drain pump/detection device error routine, according to one embodiment of the present invention;

FIG. 7 is a flow chart of a clog error routine, according to one embodiment of the present invention;

FIG. 8 is a detailed flow chart of an overfill prevention routine, according to one embodiment of the present invention;

FIG. 9 is a sectional view of the inside of a dishwasher, according to one embodiment of the present invention;

FIG. 10 is a sectional view of the inside of a dishwasher, wherein an overfill condition has occurred, according to one embodiment of the present invention;

FIG. 11 is a detail view of a detection device comprising magnetically actuated reed switches, wherein an overfill condition has occurred, according to one embodiment of the present invention;

FIG. 12 is a perspective view of the inside of dishwasher showing a detection device, according to one embodiment of the present invention;

FIG. 13 is a detail view of a portion of a detection device, according to one embodiment of the present invention; and FIG. 14 is a detailed view of a sensing device, according to one embodiment of the present invention.

DETAILED DESCRIPTION

Various embodiments of present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates one example of a dishwasher 10 capable of implementing various embodiments of the present invention. Such a dishwasher 10 typically includes a tub 12 (partly broken away in FIG. 1 to show internal details), having a plurality of walls (e.g., side wall 13) for forming an enclosure in which dishes, utensils, and other dishware may be placed for washing. As known in the art, the dishwasher 10 may also include slidable bottom and upper racks (not shown) for holding the dishes, utensils, and dishware. A door 18 may be pivotably engaged with the tub 12 to selectively permit access to the interior of the tub 12. The door 18 closes to cover and seal the tub 12 when the dishwasher 10 is in operation.

The tub 12 may define a sump 14, in which wash water or rinse water is collected, typically under the influence of gravity, wherein the sump 14 may cooperate with a bottom wall 17 to enclose the dishwasher in the tub 12. The wash/rinse water may be pumped by a sump pump 15 out of the sump 14 to various spray arms 20 mounted in the interior of the tub 12 for spraying the wash/rinse water, under pressure, onto the dishes, utensils, and other dishware contained therein.

The sump 14 may include/define various inlet ports and outlet ports in communication with various operational components of the dishwasher 10. For example, a water valve 50 and a drain pump 60 may each be in communication with the sump 14 or otherwise with the dishwasher 10. The water valve 50 may be configured to open, or turn ON, to direct water from a house water supply/source to the sump 14 or otherwise to the tub 12 of the dishwasher 10. The water valve 50 may also be configured to close, or turn OFF, to stop directing water to the tub 12. The drain pump 60 may be configured to actuate, or turn ON, to remove water from the sump 14 or tub 12, as well as being configured to deactuate, or turn OFF, to stop removing water from the sump 14 or tub 12. Thus, through selective actuation of the water valve 50/drain pump 60, water may be selectively added or removed from the dishwasher 10. The drain pump 60 and the water valve 50 may be configured to be automatically actuated (i.e., electrically opened and closed), though one skilled in the art will appreciate that such components may be actuated in different ways such as, for example, mechanically, hydraulically, and/or in other appropriate manners.

With reference to FIG. 1, particular operational components (e.g., water valve 50, drain pump 60, corresponding hoses and wires, etc.) may be housed, disposed, or otherwise positioned within a base portion 22 positioned beneath the tub 12. In some instances, the base portion 22 may be a separate component with respect to the tub 12, such as, for example, a molded polymer component, while in other instances the base portion 22 may be integral with the tub 12 such that the side walls forming the tub 12 also at least partially form the base portion 22.

The dishwasher 10 typically includes wash programs having various parameters of the dishwashing process. In particular, the dishwasher 10 may be in an operating mode when using these wash programs, which may require providing water to the dishwasher 10 to clean dishware, utensils, or the like. Thus, with reference to FIG. 2, the dishwasher 10 may at least partially fill with water provided by the water valve 50. This water may form a water level 55 inside the tub 12 of the dishwasher 10. If the components of the dishwasher 10 cease to work properly too much water may enter or remain in the tub 12, possibly causing the water to break the seal of the door 18 and leak outside of the tube 12 of the dishwasher 10. This situation represents an overfill condition, which may also correspond to the water level 55 reaching a pre-determined threshold level 25. In this regard, embodiments of the present invention may be implemented in a dishwasher 10 to more precisely monitor and control the water level 55 within the dishwasher 10, so as to prevent overfilling within the dishwasher 10.

The tub 12 may comprise at least one detection device 30 for monitoring the water level 55 and detecting an overfill condition in the tub 12. In particular, the detection device 30 can be configured to detect when the water level 55 reaches the threshold level 25, thereby signaling an overfill condition. The detection device 30 may be any type of device that can detect an overfill condition (e.g., a particularly placed sensor, a float, or the like) and can be located inside the tub 12 to detect the water level 55 of the dishwasher 10, as shown in FIGS. 12 and 13. Also, the detection device 30 may be configured to detect removal of the overfill condition (e.g., when the water level 55 recedes below the threshold level 25). In one embodiment, the detection device 30 is a float switch assembly (see FIGS. 11 and 13, discussed below).

Additionally, a control device 40 can be used to communicate with certain components of the dishwasher 10. The control device 40 may be housed inside the base portion 22 of the tub 12 or other location so as to facilitate communication with various components of the dishwasher 10. In the depicted embodiment, the control device 40 is housed in the base portion 22 of the tub 12 and is configured to communicate with the water valve 50, drain pump 60, and detection device 30. In this way, the control device 40 can determine whether the drain pump 60 is actuated or deactuated and the water valve 50 is opened or closed as well as being able to actuate or deactuate the drain pump 60 and open or close the water valve 50. Also, the control device 40 may be configured to determine if the detection device 30 has detected an overfill condition or if the detection device 30 has detected removal of the overfill condition. Furthermore, the control device 40 may be configured to communicate with the dishwasher 10 to determine if the dishwasher 10 is in an operating mode, and more particularly, whether the dishwasher 10 requires water to be provided to it. The control device 40 may be any type of device that can communicate with the components of the dishwasher 10, electronically, mechanically, or otherwise. In the case of electronic communication, the control device 40 may include a memory for storing of programming, routines, and variables. In such a case, the control device 40 may be configured to indicate or otherwise provide error message signals by either storing them in the control device 40 for later access by a user, signaling the dishwasher 10 to display the error message to the user, or other indicating means. In one embodiment, the control device 40 is a microprocessor or other processor configured to perform the functions described herein and may operate under the control of software. The control device 40 may be configured to automatically control the water valve and drain pump in response to receiving a signal indicative of an overfill condition, as explained in further detail below.

In various embodiments, the dishwasher 10 may also comprise a sensing device 45 for sensing the presence of water in the dishwasher 10. The sensing device 45 can be placed anywhere in the dishwasher 10 where it is in communication with the content of the sump 14 and/or tub 12 to sense for the presence of water. For example, a pressure switch, mounted in the base, could have a capillary tube in communication with the sump. Water in the sump would pressurize the water/air in the capillary tube providing input to the sensor concerning water level height. In the depicted embodiment, the sensing device 45 is located inside the sump 14. The control device 40 can also communicate with the sensing device 45. In some embodiments of the invention, the sensing device 45 can be used as a back-up to the detection device 30 or otherwise used for redundancy. The sensing device 45 can be any device with the ability to sense the presence of water, such as a conductivity sensor or a turbidity sensor (shown in FIG. 14). In one embodiment, the turbidity sensor can serve a dual purpose of sensing turbidity of water during an operation mode as well as sensing the presence of water during an overfill routine, as described below.

FIG. 3 shows a block diagram of one embodiment of a system for preventing overfilling in a dishwasher. The system comprises a control device 40 configured to communicate with a water valve 50, drain pump 60, and detection device 30. This system detects and removes overfill conditions in the dishwasher 10 by using a prevention routine 70 and corresponding method for preventing overfilling in a dishwasher, as described in greater detail below. The system may also comprise a sensing device 45 and may diagnose errors in the components of the system by using any one or more of error routines 100, 200, 300 as also described below.

FIG. 4 shows a flow chart of one embodiment of a method for preventing overfilling in a dishwasher, which is referred to herein as an overfill routine 80. The overfill routine 80 details a method for preventing overfilling in a dishwasher. The overfill routine 80 can be executed in response to detecting an overfill condition, and is not dependant on the dishwasher 10 being in an operation mode, such as washing. Additionally, program instructions containing the overfill routine 80 may be stored in a memory of the control device 40 or a computer program product otherwise in communication with the control device.

In various embodiments of the invention, the overfill routine 80 comprises a prevention routine 70. As shown in FIG. 4, the prevention routine 70 comprises detecting an overfill condition (Step 72), and controlling the drain pump and water valve in response to detecting the overfill condition in order to facilitate removal of the overfill condition. Controlling of the drain pump and water valve may continue until either the detection device no longer detects the overfill condition (Step 75) or a pre-determined amount of time has passed. Additionally, controlling the drain pump and water valve could include performing a pump-out cycle comprising closing or turning OFF the water valve and actuating or turning ON the drain pump (Step 73) to stop providing water to, and start removing water from, the dishwasher. Once either removal of the overfill condition is detected or the pre-determined amount of time has passed, the prevention routine 70 could further comprise completing the pump-out cycle by deactuating or turning OFF the drain pump (Step 76). Also, the prevention routine 70 can further comprise determining if the dishwasher is in an operating mode (Step 78) and then continuing its operating mode if necessary (Step 79), such as continuing the washing cycle.

With reference to FIG. 4, the method for preventing overfilling in a dishwasher may be automatically executed upon detection of an overfill condition. For example, an overfill condition may occur when the water level 55 reaches the threshold level 25. In particular, upon detecting the water level 55 reaching the threshold level 25 (Step 72), the control device 40 may receive a signal from the detection device 30 indicating an overfill condition has occurred. The control device 40 may then signal and control the water valve 50 and drain pump 60 to complete Step 73, whereby a pump-out cycle is performed in which the water valve 50 is closed to stop the flow of water to the dishwasher 10 and the drain pump 60 is actuated to encourage removal of water from the dishwasher 10. This causes the water to drain out of the dishwasher 10, thereby removing the overfill condition (i.e., the water level 55 lowers below the threshold level 25).

In addition, the method may further comprise detecting removal of the overfill condition in the dishwasher (Step 75), which occurs when the detection device 30 no longer detects the overfill condition (i.e., when the water level 55 is lower than the threshold level 25). Thus, when the detection device 30 detects removal of the overfill condition, the control device 40 can deactuate the drain pump 60 (Step 76), thereby completing a pump-out cycle. This stops the drain pump 60 from operating when no water is present, thus conserving energy and reducing the possibility of damaging the pump.

Furthermore, the method may further comprise determining if the dishwasher 10 is in an operating mode, such as a washing cycle. Thus, the control device 40 can be configured to communicate with the dishwasher 10 to determine if the dishwasher 10 is in an operating mode and whether the water valve 50 should be open or turned ON (Step 78). If the dishwasher 10 is in an operating mode, the control device 40 can signal and continue the operating mode (Step 79), thereby allowing the prevention routine 70 to return the dishwasher 10 to its correct operating mode. Thus, the prevention routine 70 can be responsive throughout a dishwasher's 10 operating mode, and only briefly interrupt the operating mode when necessary.

With reference to FIGS. 4 and 5, in another embodiment, the overfill routine 80 can further comprise a water valve error routine 100 for detecting errors that may occur in the water valve 50 during or following a prevention routine 70. The water valve error routine 100 comprises determining the number of times an overfill condition has been detected (Step 110) and determining if an overfill condition has been detected following a pre-determined number of pump-out cycles (Step 115). If the overfill condition has been detected following X consecutive pump-out cycles, the water valve error routine 100 initiates an ongoing pump out cycle (Step 120). The ongoing pump out cycle includes turning the water valve OFF or keeping the water valve closed and then cycling the drain pump ON (Step 130) and OFF (Step 140) until the fault is cleared.

In particular, the water valve error routine 100 monitors how often an overfill condition is occurring in the dishwasher 10. Thus, if the prevention routine 70 continuously initiates pump-out cycles to remove overfill conditions, there may be a malfunction with the water valve 50. Therefore, after X pump-out cycles running consecutively, the water valve error routine 100 would initiate an ongoing pump-out cycle (Step 120). X can be any pre-determined number (e.g., 2, 3, 4, etc.). For example, the water valve error routine 100 could detect the prevention routine 70 initiating three consecutive pump-out cycles and then in response, initiate an ongoing pump-out cycle. The ongoing pump out cycle can be used to repeatedly drain the dishwasher 10 of water until the water valve fault is cleared or the overfill condition is otherwise removed (Step 150).

The water valve error routine 100 may also comprise determining the flow rate of water through the water valve (Step 160). Additionally, the water valve error routine 100 could determine the amount of time that elapses between pump-out cycles or between detection and removal of the overfill condition (Step 165). The control device 40 can thereby set the ongoing pump-out cycle to correspond to the amount of water being released by the water valve 50 into the dishwasher 10 over the period of time determined between detection and removal of the overfill condition. The period of time between actuating/deactuating the water valve and/or drain pump could alternatively be used in conjunction with the flow rate. Moreover, the water valve error routine 100 may also comprise providing a WATER VALVE ERROR signal (Step 180), which could be any perceptible signal provided to a user (e.g., an audible or a visual alarm).

FIGS. 4 and 6 show another embodiment of the invention, wherein the overfill routine 80 may also comprise a drain pump/detection device error routine 200 for detecting errors that may occur in the drain pump 60 or detection device 30. The drain pump/detection device error routine 200 comprises determining whether water is present in the dishwasher following a pre-determined time equal to ¥ elapsing following initiation of a pump-out cycle (Step 215). It should be noted that the time ¥ could elapse before or after completion of the pump-out cycle, whether completion occurs due to either the detection device detecting removal of the overfill condition or the pre-determined amount of time for completion of the pump-out cycle elapsing. Either way, after time ¥ has elapsed, the drain pump/detection device error routine 200 comprises sensing for the presence of water (Step 220). If the sensing device 45 senses water, then a malfunction in the drain pump 60 has occurred (Step 245) because the drain pump 60 was unable to properly remove the water in the pre-determined duration. Therefore, the drain pump 60 may not be working properly or may be clogged. In this case, the drain pump/detection device error routine 200 may further comprise providing a DRAIN PUMP ERROR signal (Step 285) (e.g., an audible or a visible signal). Alternatively, if the sensing device 45 does not sense the presence of water following the pre-determined duration, then a malfunction in the detection device 30 has occurred (Step 240) because the water and overfill condition has been removed, but the detection device 30 failed to detect this removal. In this case, the drain pump/detection device error routine 200 may further comprise providing a DETECTION DEVICE ERROR signal (Step 280) (e.g., an audible or a visible signal). ¥ may be customizable as any pre-determined length of time (e.g., 1.7 seconds, 2 seconds, 4 minutes, etc.) that is deemed sufficient to remove the overfill condition.

In another embodiment, shown in FIGS. 4 and 7, the overfill routine 80 may also comprise a clog error routine 300 for detecting errors in the drain pump 60, which may be a clog in the drain filter or drain hose of the drain pump 60. The clog error routine 300 comprises determining if an overfill condition is present (Step 320) following initiation of a pump-out cycle (i.e., closing the water valve and actuating the drain pump) for a pre-determined time £ (Step 315). £ is customizable as any pre-determined length of time (e.g., 1.3 seconds, 3 seconds, 5 minutes, etc.) deemed sufficient to remove the overfill condition, and the time £ could elapse before or after completion of the pump-out cycle. Thus, the clog error routine 300 determines if the detection device is activated or otherwise still indicating an overfill condition following the pre-determined time £. If the detection device is still activated, the clog error routine 300 may further comprise providing a DRAIN FILTER or DRAIN HOSE ERROR signal (Step 380) (e.g., an audible or a visible signal).

Referring to FIG. 4, the overfill routine 80 may therefore comprise the prevention routine 70 alone or in combination with any one or more of the error routines 100, 200, 300, such as those described above. As such, the method for preventing overfilling in a dishwasher is customizable and adaptable to respond to various overfill conditions. In one particular embodiment, as shown in FIG. 8, an overfill prevention routine 400 comprises a prevention routine, a water valve error routine, and a drain pump/detection device error routine. In the depicted embodiment, upon detection of an overfill condition (i.e., the float switch trips (Step 410)) the overfill prevention routine 400 first determines if a drain pump, water valve, or float switch error (Step 441, 451, 461) currently exists and if the dishwasher is in an operating mode (Step 412). If the dishwasher is washing, the washing is paused (Step 413), and the overfill prevention routine 400 takes a turbidity reading of the water (Step 414). Then, the overfill prevention routine 400 actuates the drain pump (Step 415) until the float switch detects removal of the overfill condition (Step 420) in which it deactuates the drain pump after a pre-determined amount of time (Step 425). If the float switch does not re-detect an overfill condition (Step 470) and a pre-determined fill wait time has passed (Step 405), then the overfill prevention routine 400 determines if the dishwasher was previously washing in an operating mode (Step 406). If the dishwasher was washing, then washing is resumed (Step 407), but if the dishwasher was not washing, then a False Alarm occurs and the overfill prevention routine 400 is exited.

However, should the float switch re-detect an overfill condition (i.e., the float switch trips again (Step 470)), the pump-out cycle is re-initiated by actuating the drain pump (Step 415) until the float switch un-trips and signals removal of the overfill condition (Step 420). This process can repeat, and the overfill prevention routine 400 also includes executing a water valve error routine upon the fourth consecutive detection of an overfill condition (i.e., the float switch trips and un-trips for the fourth time consecutively) (Step 470). Then, the overfill prevention routine 400 cancels the wash (Step 475) and drains for a pre-determined amount of time (i.e., turning the drain pump ON (Step 480)). Finally, the overfill prevention routine 400 provides a water valve error signal (Step 450).

Furthermore, the overfill prevention routine 400 also comprises executing a drain pump/detection device error routine upon a pre-determined amount of time passing after detecting the overfill condition (i.e., the float switch tripping) and before detecting removal of the overfill condition (i.e., the float switch un-tripping) (Step 430). If this occurs, the overfill prevention routine 400 cancels the wash (Step 431) and senses for the turbidity of water with the turbidity sensor (Step 435). If water is sensed, the overfill prevention routine 400 provides a drain pump error signal (Step 440). Alternatively, if water is not sensed, the overfill prevention routine 400 provides a float switch error signal (Step 460).

With reference to FIGS. 9-13, the detection device 30 may comprise a float switch assembly. In particular, the float switch assembly may comprise a float 34, float post 36, and float switch 38 for detecting the water level 55 inside the dishwasher 10. As illustrated by FIGS. 9 and 10, the float 34 can be configured to rise and fall with the water level 55 with respect to the float post 36. The float switch 38 may be configured to interact with the float 34, such that when the float 34 rises to the threshold level 25 indicating an overfill condition, the float switch 38 signals to the control device 40 that an overfill condition has occurred.

One embodiment of the present invention uses a detection device 30 comprising a float switch assembly with a sealed construction. As shown in FIGS. 11-13, the float switch assembly can be located in the base of the tub and outside of the sump. The sealed construction of the float switch assembly does not have an opening leading to outside the dishwasher 10, thereby eliminating any paths for water to leak out of the unit. This float switch assembly can be configured in a sealed construction comprising a magnetically actuated reed switch 38. In particular, as depicted in FIG. 11, at least one magnetically actuated reed switch 38 can be associated with the float post 36. Additionally, at least one magnet 32 can be associated with the float 34. Thus, the magnetically actuated reed switch 38 can sense the magnet 32 on the float 34, such that when the float 34 rises to the threshold level 25, the float switch 38 no longer senses the magnet 32 and thereby signals to the control device 40 that an overfill condition has occurred. In various embodiments, the float switch 38 is configured to open and close. In particular, the float switch 38 opens when it no longer senses the magnet 32 (e.g., detects an overfill condition) and closes when it senses the magnet 32 (e.g., detects removal of the overfill condition). As such, the float switch can be configured to actuate or open when the float is activated by rising with the water level to the threshold level, thereby indicating an overfill condition. In the depicted embodiment, the detection device 30 comprises a float switch assembly that utilizes two magnetically actuated reed switches 38. The at least one magnetically actuated reed switch 38 can be any magnetically actuated switch, such as a magnetically actuated reed switch or other electrically actuated device with a sealed construction. However, the sealed switch 38, may be any magnetically, electrically, or optically actuated device, which reduces any potential for mechanical failure of the detection device.

According to one aspect of the invention, all or a portion of the system generally operates under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

In this regard, FIGS. 3-8 are flowcharts of methods, systems and program products according to the invention. It will be understood that each block or step of the flowchart, and combinations of blocks in the flowchart, can be implemented by computer program instructions. These computer program instructions may be loaded onto a computer, processor, or other programmable apparatus to produce a machine, such that the instructions which execute on the computer, processor, or other programmable apparatus create means for implementing the functions specified in the flowchart block(s) or step(s). These computer program instructions may also be stored in a computer-readable memory that can direct a computer, processor, or other programmable apparatus to function in a particular manner, such that the instructions stored in the computer-readable memory produce an article of manufacture including instruction means which implement the function specified in the flowchart block(s) or step(s). The computer program instructions may also be loaded onto a computer, processor, or other programmable apparatus to cause a series of operational steps to be performed on the computer, processor, or other programmable apparatus to produce a computer implemented process such that the instructions which execute on the computer, processor, or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for preventing overfilling in a dishwasher, wherein the dishwasher comprises a water valve configured to provide water to the dishwasher and a drain pump configured to remove water from the dishwasher, the method comprising:
   detecting an overfill condition in the dishwasher with at least one detection device, the overfill condition corresponding to a water level in the dishwasher that is greater than a predetermined threshold;
   executing a pump-out cycle in response to detecting the overfill condition, wherein the pump-out cycle comprises actuating the drain pump and deactuating the water valve in order to facilitate removal of the overfill condition;
   determining if the overfill condition has been removed; and
   executing at least one error routine to diagnose an error in at least one component of the dishwasher in response to determining that the overfill condition has not been removed, wherein executing the at least one error routine comprises executing a drain pump/detection device error routine comprising:
      determining, in response to determining that the overfill condition has not been removed, if water is present in the dishwasher with a sensing device following execution of the pump-out cycle for a predetermined period of time.

2. The method according to claim 1, wherein executing the pump-out cycle comprises executing the pump-out cycle: i.) until the overfill condition is removed, or ii.) for a predetermined amount of time.

3. The method according to claim 1 further comprising deactuating the drain pump when the overfill condition is removed.

4. The method according to claim 1, wherein executing the at least one error routine further comprises executing a water valve error routine, the water valve error routine comprising:
   determining if a threshold number of consecutive overfill conditions have been detected; and
   executing, in response to determining that the threshold number of consecutive overfill conditions has been detected, an ongoing pump-out cycle until the overfill condition is removed.

5. The method according to claim 4, wherein executing the water valve error routine further comprises:
   determining a flow rate of the water through the water valve and an elapsed time between successive pump-out cycles; and
   setting the ongoing pump-out cycle to correspond to the flow rate of the water through the water valve and the elapsed time between successive pump-out cycles.

6. The method according to claim 4, wherein executing the water valve error routine further comprises providing a water valve error signal in response to determining that the threshold number of consecutive overfill conditions has been detected.

7. The method according to claim 1, wherein the drain pump/detection device error routine further comprises providing a detection device error signal in response to sensing no water in the dishwasher.

8. The method according to claim 1, wherein the drain pump/detection device error routine further comprises providing a drain pump error signal in response to sensing the presence of water in the dishwasher.

9. The method according to claim 1, wherein the determining step comprises determining whether water is present in the dishwasher with a sensing device comprising a turbidity sensor.

10. The method according to claim 1, wherein executing the at least one error routine further comprises executing a clog error routine, the clog error routine comprising:
    executing the pump-out cycle for a predetermined period of time; and
    determining if the overfill condition has been removed after the predetermined period of time.

11. The method according to claim 10, wherein the clog error routine further comprises providing a drain filter error signal or a drain hose error signal in response to determining that the overfill condition has not been removed after the predetermined period of time.

12. The method according to claim 1, wherein the detecting step comprises detecting an overfill condition with at least one detection device comprising a float and a float switch, wherein the float is movable in relation to the float switch such that the float switch is configured to be actuated when the float is activated by an overfill condition.

13. The method according to claim 12, wherein detecting comprises detecting an overfill condition with at least one magnetically actuated reed switch configured to be actuated in response to movement of a magnet associated with the float.

14. A system for preventing overfilling in a dishwasher, the system comprising:
    a water valve configured to provide water to the dishwasher;

a drain pump configured to remove water from the dishwasher;

at least one detection device configured to detect an overfill condition in the dishwasher, the overfill condition corresponding to a water level in the dishwasher that is greater than a predetermined threshold; and a control device configured to execute a pump-out cycle in response to detecting the overfill condition, wherein the pump-out cycle comprises actuating the drain pump and deactuating the water valve in order to facilitate removal of the overfill condition, wherein the control device is further configured to determine if the overfill condition has been removed and execute at least one error routine to diagnose an error in at least one component of the dishwasher in response to determining that the overfill condition has not been removed, wherein the at least one error routine comprises executing a drain pump/detection device error routine comprising:

determining, in response to determining that the overfill condition has not been removed, if water is present in the dishwasher with a sensing device following execution of the pump-out cycle for a predetermined period of time.

15. The system according to claim 14, wherein the at least one detection device comprises a float and a float switch, wherein the float is movable in relation to the float switch such that the float switch is configured to be actuated when the float is activated by an overfill condition.

16. The system according to claim 15, wherein the float switch comprises at least one magnetically actuated reed switch configured to be actuated in response to movement of a magnet associated with the float.

17. The system according to claim 14 further comprising a turbidity sensor for sensing the presence of water in the dishwasher and communicating with the control device.

18. The system according to claim 14, wherein the drain pump/detection device error routine further comprises providing a detection device error signal in response to sensing no water in the dishwasher.

19. The system according to claim 14, wherein the drain pump/detection device error routine further comprises providing a drain pump error signal in response to sensing the presence of water in the dishwasher.

20. A computer program product for preventing overfilling in a dishwasher, wherein the dishwasher comprises a water valve configured to provide water to the dishwasher and a drain pump configured to remove water from the dishwasher, the computer program product comprising a non-transitory computer-readable storage medium having computer-readable program code portions stored therein, the computer-readable program code portions comprising:

a first executable portion configured to detect an overfill condition in the dishwasher with at least one detection device, the overfill condition corresponding to a water level in the dishwasher that is greater than a predetermined threshold;

a second executable portion configured to execute a pump-out cycle in response to detecting the overfill condition, wherein the pump-out cycle comprises actuating the drain pump and deactuating the water valve in order to facilitate removal of the overfill condition;

a third executable portion configured to determine if the overfill condition has been removed; and a fourth executable portion configured to execute at least one error routine to diagnose an error in at least one component of the dishwasher in response to determining that the overfill condition has not been removed, wherein the at least one error routine comprises executing a drain pump/detection device error routine comprising:

determining, in response to determining that the overfill condition has not been removed, if water is present in the dishwasher with a sensing device following execution of the pump-out cycle for a predetermined period of time.

\* \* \* \* \*